Patented May 25, 1954

2,679,453

UNITED STATES PATENT OFFICE 2,679,453

METHOD AND COMPOSITION FOR THE CONTROL OF UNDESIRED VEGETATION

Charles H. Brett, Raleigh, N. C., and Ernest M. Hodnett, Stillwater, Okla.

No Drawing. Application October 10, 1952, Serial No. 314,206

19 Claims. (Cl. 71—2.5)

This invention relates to herbicides and is particularly directed to a composition and method for killing or otherwise controlling the growth of undesired vegetation.

The concept of the chemical control of vegetation is of fairly recent origin. Beginning with the use of inorganic materials such as chlorates, arsenites, borax and salt, this practice has progressed through phytotoxic petroleum products and dinitrophenols to the aryloxy aliphatic acids and their esters and salts. The widespread acceptance of such control methods has brought into focus certain shortcomings of commonly employed procedures. With those inorganic materials heretofore proposed for soil and plant treatment, hundreds or even thousands of pounds per acre may be required to accomplish even a transitory and superficial control of vegetation. Many of the materials of organic origin, when applied to the aerial portions of weeds accomplish only a top killing of foliage or a chemical mowing. The subsequent regrowth from the unaffected roots, oftentimes results in a more severe infestation than existed prior to treatment. Further, many of the toxicants have the property of being capable of selectively controlling only one type of vegetation such as broadleaf weeds. Thus, it has not generally been possible to obtain a selective control of certain narrowleaf vegetation such as crab grass in stands of desirable crop plants and grass species.

It is an object of the present invention to provide a novel composition and method for the control of the growth of vegetation and the killing of weeds. A further object is the provision of a method for the selective control of undesired vegetation in desirable crop plant species. Other objects will become apparent from the following specification and claims.

According to the present invention, it has been discovered that the growth of vegetation may be suppressed by applying to the foliage thereof a growth inhibiting amount of a trichloromethyl substituted pyridine product. The latter compounds are oily liquids or crystalline solids somewhat soluble in many organic solvents and relatively insoluble in water. They appear to be highly toxic to many undesirable plant species and particularly to certain broad leaf weeds and to grasses of the sub-family Panicoideae such as common crab, foxtail, Chase Fall witch grass and tickle grass. Thus, they may be employed for the selective control of susceptible broad leaf weeds and of grasses of this sub-family in certain highly desirable crop plants and particularly in Bermuda grass.

The preferred embodiments of this invention are (1) a concentrate composition for the suppression of the growth of vegetation which comprises as an active toxic ingredient a trichloromethyl substituted pyridine in admixture with at least one material of the group consisting of finely divided inert solids and surface active dispersing agents, and (2) a method for the control of the growth of vegetation which comprises contacting the foliage of vegetation with a growth inhibiting dosage of the same pyridine toxicants.

The expression "surface active dispersing agent" as herein employed, is intended to include all agents which are capable of acting at the interfacial surface between the pyridine toxicant and water as the dispersion medium, so as to facilitate the dispersion of the toxicant in water. Thus, the term is inclusive of the solid emulsifying agents such as finely divided aluminum hydroxide and finely divided bentonite, fuller's earth, attapulgite and other clays, as well as the ionic and non-ionic wetting and emulsifying agents such as the alkaline earth metal caseinates, alkyl aryl sulfonates, sulfonated oils, complex organic ester derivatives, complex ether alcohols, condensation products of alkylene oxides with phenols and organic acids, polyoxyethylene derivatives of sorbitan esters, mahogany soaps and the like.

The term "finely divided inert solids" as herein employed refers to materials which are incapable of facilitating the dispersion of the water-immiscible pyridine toxicants in water as the dispersion medium and is intended to include finely divided materials such as chalk, talc, gypsum and the like.

When operating in accordance with the present invention, the toxicants may be compounded with any of the finely divided inert solids to form dust compositions, by grinding, mixing or by wetting the finely divided carrier with a solution of the toxicant in a volatile organic solvent. Similarly, dust compositions containing the pyridine toxicants may be compounded from various of the solid surface active dispersing agents, such as bentonite, fuller's earth, attapulgite and other clays. Depending upon the proportions of ingredients, these dust mixtures may be employed either as treating compositions, or as concentrates and subsequently diluted with additional solid surface active dispersing agent or with talc, chalk, gypsum, and the like to obtain the desired amount of active ingredient in a composition adapted to be applied for the suppression of plant growth. Also, such concentrate dust compositions may be dispersed in water with or without the aid of additional dispersing agent, to form spray mixtures. Dust concentrates compounded from liquid pyridine products commonly contain from 5 to 20 percent by weight of toxic ingredient, while those compounded from the crystalline pyridine products may contain from 5 to 95 percent by weight of such ingredient.

Further, the pyridine compounds or dust concentrate compositions containing such toxicants may be incorporated in intimate mixture with other surface active dispersing agents such as ionic and non-ionic emulsifying agents to form spray concentrates. Such concentrates are readily dispersible in liquid carriers to form sprays containing the toxicant in any desired amount. The choice of dispersing agent and amount thereof employed are determined by the ability of the agent to facilitate the dispersion of the concentrate in the liquid carrier to produce the desired spray composition.

Similarly, the pyridine toxicants may be compounded with suitable water-immiscible organic liquids and surface active dispersing agents to produce emulsifiable liquid concentrates which may be further formulated with water and/or oil to prepare spray mixtures in the form of aqueous dispersions or oil in water emulsion compositions. In an alternative procedure, the pyridine compounds or solutions thereof in suitable water-immiscible solvents, may be dispersed in an aqueous emulsion comprising a water-immiscible organic liquid, a dispersing and emulsifying agent and water. Preferred dispersing agents to be employed in these compositions are oil soluble and include the non-ionic emulsifiers such as the condensation products of alkylene oxide with phenols and organic acids, polyoxyethylene derivatives of sorbitan esters, complex ether alcohols and the like. However, oil soluble ionic emulsifying agents such as mahogany soaps may also be used. Suitable organic liquids to be employed in the compositions include petroleum oil and distillates, toluene, xylene, liquid halohydrocarbons and synthetic organic oils.

In the emulsifiable concentrates and the other concentrate compositions described above, the toxicant preferably constitutes from about 5 to 95 percent by weight of the composition.

The exact concentration of the pyridine compounds employed in compositions for killing growing vegetation is not as important as the provision of a minimum effective dosage to accomplish the desired result. This minimum dosage of toxicant is dependent upon the plant species concerned and the stage of growth and susceptibility of the vegetation to be controlled. For the control of certain broad leaf weeds, good results are obtained when from about 2 to 48 pounds or more of toxicant is applied per acre. At least 6 pounds of toxicant per acre is required for the control of more susceptible grasses, and larger amounts up to 200 pounds or more per acre are employed against less susceptible species. In selective applications for the control of grasses of the sub-family of Panicoideae in desirable crop plants and particularly in Bermuda grass, good results may be obtained at a dosage of from 6 to 48 pounds per acre. These dosages of toxicant may be applied per acre in from 20 to 200 gallons or more of water or other liquid carrier or in from 40 to 300 pounds or more of solid carrier.

The concentration of toxicant in spray compositions generally runs from about 0.1 to about 50 percent by weight or higher. In dusts, the concentration of the toxicant may be from about 1 to 95 percent by weight.

The new dust and spray compositions may be applied to the foliage of plants by conventional methods, e. g. with power dusters, boom and hand sprayers and spray dusters. In large scale operations, dusts or sprays may be applied from an airplane.

The application of the trichloromethyl substituted pyridines or a composition containing the toxicants to plant foliage gives rise to varying degrees of response in plants depending upon factors such as the nature of the plant, the toxicant concentration in the composition and the dosage of toxicant per unit area, as well as conditions of temperature and moisture. When very large dosages and high concentrations are employed, a substantial denuding of the soil of many plant species is obtained. In substantially smaller dosages and at lower concentrations, the trichloromethyl substituted pyridines suppress the growth of numerous weeds and particularly grasses of the sub-family of Panicoideae, while permitting the growth of certain desirable crop plants including Bermuda grass. Thus, it is possible to effect a selective treatment of mixed stands of crab and Bermuda grass. Even when the crab grass is only partially affected, the Bermuda grass is able to choke out the crab grass invader by reason of its more vigorous growth. Similarly, under optimum conditions, a selective control is possible of crab grass and susceptible broad leaf weeds in immature cotton. The latter result is most conveniently accomplished with those members of the trichloromethyl substituted pyridine group which do not contain nuclear substituted chlorine. Depending upon the state of maturity of the cotton and the degree to which the cotton plants have been hardened by weathering, the trichloromethyl substituted pyridines may be so employed at dosages of from about 2 pounds to about 48 pounds per acre and preferably at 6 to 24 pounds per acre. This selective control constitutes a preferred embodiment of the invention.

The following examples illustrate the invention but are not to be construed as limiting.

Example 1

Five parts by weight of 2,4,6-tris(trichloromethyl) pyridine, 13 parts of xylene and 0.5 part of an N-acyl aminoalkylsulfonate product (Vel) were mechanically mixed together to prepare a concentrate composition in the form of an emulsifiable liquid. The latter concentrate was dispersed in water to produce an aqueous spray composition containing about 5 grams of 2,4,6-tris-(trichloromethyl) pyridine per liter of the ultimate mixture. The latter spray composition was applied to the foilage of the grass in a lawn area consisting of a mixed stand of common Bermuda, common crab, foxtail, Chase Fall witch and tickle grasses. The distribution of the grasses was about 45 percent Bermuda, 40 percent crab, and 5 percent of each of the other named species. In the operation, the application was made to a portion of the lawn area with a conventional knap-sack sprayer and at a dosage of about 24 pounds of 2,4,6-tris(trichloromethyl) pyridine per acre. The remaining untreated lawn area was maintained as a check.

Four days after the application, the foliage of the grasses in the treated area was found to be somewhat discolored. 30 days and 60 days after the application, the treated plot was critically inspected and a 100 percent kill of crab grass, fox-tail, Chase Fall witch grass and tickle grass observed. The Bermuda grass was unharmed. At the time of the later observations, there was found a greener and more luxuriant stand of Bermuda grass in the treated area than in the check area, where the crab, foxtail, witch and tickle grasses had flourished at the expense of the Bermuda grass. In the treated area, the Bermuda grass continued in an active state of growth throughout the growing season.

*Example 2*

A concentrate composition was prepared in the form of an emulsifiable liquid by mechanically mixing together 5 parts by weight of a 2,6-bis-(trichloromethyl) pyridine product, 13 parts of xylene and 5 parts of Vel. The latter composition was dispersed in water to produce an aqueous spray composition containing about 10 grams of toxicant per liter of the ultimate mixture. This spray composition was employed on a lawn area for the control of crab grass in a mixed stand with common Bermuda grass. The grass species were about equally distributed in the lawn. The spray composition was applied as described in Example 1 to the foliage of the grass in a portion of the lawn area, and at a dosage of about 24 pounds of the pyridine product per acre. The remaining untreated area was maintained as a check.

Four days after the application, the foliage of the treated grass was examined and found to be somewhat discolored. 30 days and 60 days following the application of the spray mixture, a 100 percent kill of crab grass was observed. The Bermuda grass was uninjured and its stand was improved over that in the untreated check areas. In the latter, the crab grass had flourished at the expense of the Bermuda grass. In the treated area the Bermuda grass continued in an active state of growth throughout the growing season.

*Example 3*

Five parts by weight of 2,6-bis(trichloromethyl) pyridine, 13 parts of xylene and 5 parts of Vel were mixed together and the resulting concentrate composition thereafter dispersed in water to prepare a herbicide composition containing about 10 grams of the pyridine compound per liter of solution. This composition was sprayed over a portion of a lawn area containing a mixed stand of common Bermuda, common crab and carpet grasses. The distribution of the grasses in the area was about 45 percent Bermuda, 45 percent crab and 10 percent carpet grasses. The application was made at a dosage of about 48 pounds per acre with the untreated grass area being maintained as a check.

30 days and 60 days following the treatment, the lawn was examined and a 100 percent kill of crab grass and a 75 percent kill of carpet grass observed. The stand of Bermuda grass was unharmed and improved over that in the check areas. In the latter, all species of grass were in an active state of growth during the observation period. Active growth of the Bermuda grass in the treated area continued throughout the growing season.

*Example 4*

Ten parts by weight of 2,6-bis(trichloromethyl) pyridine, 0.5 part of an alkyl aryl sulfonate product (Swirl) and 22 parts of xylene were mechanically mixed together to prepare a concentrate composition in the form of an emulsifiable liquid. In a similar manner, an analogous concentrate composition was prepared in which 2,4,6-tris-(trichloromethyl) pyridine was substituted for the 2,6-bis(trichloromethyl) pyridine of the above composition. These concentrates were separately dispersed in water to prepare aqueous emulsion compositions containing about 36 pounds of pyridine compound per 100 gallons of solution. The foliage and stems of mature alfalfa plants were uniformly wet with these emulsion compositions. Eight hours following the applications, the plants were examined. The stem and leaf surfaces were found to be dark in color and in a dead or dying condition.

*Example 5*

Two parts by weight of 3,4,5-trichloro-2-trichloro-methyl pyridine, 2 parts of a modified polyethylene glycol mono-oleate-alkyl aryl sulfonate mixture (Trex 80) and 2 parts of xylene were mechanically mixed together to prepare an emulsifiable concentrate composition. This concentrate was thereafter dispersed in water to produce a herbicide composition containing about 8 pounds of the pyridine compound per 100 gallons. The foliage and stems of tomato plants were uniformly wet with the aqueous emulsion. Other untreated tomato plants were maintained as checks.

Sixteen days after the application, the plants were examined and a 100 percent kill of the treated plants observed. The check plants continued in a vigorous and luxuriant state of growth.

*Example 6*

A concentrate composition having the following parts by weight of ingredients was prepared by mixing the constituent materials together at room temperature.

Monochloro-2,6-bis(trichloromethyl) pyridine (melting at 86.5°–87.5° C.) _____ 1
A dimeric alkylated aryl polyether alcohol product (Triton X-155) _____ 1
Xylene _____ 1

This concentrate was dispersed in water to produce two aqueous emulsion compositions, one containing about 4 pounds and the other about 8 pounds of the pyridine compound per 100 gallons of ultimate mixture. These compositions were applied to tomato plants as previously described and the plants observed at intervals for evidence of herbicidal effect. Untreated tomato plants were maintained as checks. Sixteen days after treatment, a 100 percent kill of all treated plants was observed. In contrast, the untreated check plants were all alive and growing vigorously.

*Example 7*

25 parts by weight of 5-chloro-2-trichloromethyl pyridine, 10 parts of Triton X-155 and 65 parts of xylene were mixed together and the resulting concentrate composition subsequently dispersed in water to produce a spray composition containing about 18 pounds of the pyridine compound per 100 gallons of spray mixture. This composition was employed for the control of pigweed (Amaranthus spp.), lamb's quarters (*Chenopodium album*), foxtail (*Hordeum murinum*), purslane (*Portulaca oleracea*) and tomato. In such operations, stands of the named plant species were sprayed with the composition at a dosage of 100 gallons per acre. In a control operation, other stands of the named species were sprayed at a dosage of 100 gallons per acre with a composition containing no herbicide toxicant but the same proportions of water, Triton X-155 and xylene as found in the spray mixture containing the pyridine compound. Examination one week following the applications, showed that all plants treated with the spray containing the pyridine compound had been fatally injured and were either dead or dying. In the control plots, the named plant species were found unaffected by the xylene emulsion and in a vigorous state of growth.

*Example 8*

A concentrate composition was prepared in the form of an emulsifiable liquid by mixing together 25 parts by weight of monochloro-2,6-bis(trichloromethyl) pyridine (melting at 86.5°-87.5° C.), 10 parts of Triton X-155 and 65 parts of xylene. An aqueous spray composition containing about 18 pounds of the pyridine compound per 100 gallons of spray mixture, was prepared from this concentrate composition in the usual manner. The spray composition was applied to stands of ragweed, soya bean, pigweed, lamb's quarters, foxtail, radish, purslane, tomato and cranberry bean. The application techniques were those as described in Example 7, the applications being made at a dosage of 100 gallons per acre. In a control operation, stands of the named plant species were sprayed at a dosage of 100 gallons per acre with a composition containing only the proportions of water, Triton X-155 and xylene as employed in the spray containing the pyridine compound. One week after the applications, the plots were examined and a 100 percent control observed for all plant species treated with the composition containing the pyridine compound. In the control plots, the plants were found unaffected by the aqueous xylene emulsion, and in a vigorous state of growth.

*Example 9*

The concentrate composition of Example 8 was dispersed in water to produce a spray composition containing about 4.5 pounds of the pyridine compound per 100 gallons of spray mixture. This composition was applied in the usual fashion to stands of pigweed, lamb's quarters, foxtail, purslane and tomato at a dosage of 100 gallons per acre. Other stands of the named plant species were maintained as controls, as previously described. Examination one week after treatment showed that a 100 percent control of all plant species was obtained with the composition containing the pyridine compound. In contrast, the plant species employed as controls were all in a luxuriant state of growth.

*Example 10*

A spray composition containing about 18 pounds of 3,5-dichloro-2-trichloromethyl pyridine per 100 gallons of spray mixture was prepared in the usual manner from a concentrate composition containing 25 parts by weight of toxicant, 10 parts of Triton X-155 and 65 parts of xylene. This composition was applied to stands of foxtail and purslane at a dosage of 100 gallons per acre and the plant species observed daily for herbicidal effect. One week after the applications, all the plants were either dead or dying. In contrast, normal, vigorous growth of both plant species was observed in the plots maintained as controls.

*Example 11*

25 parts by weight of 2,4,5-trichloro-2-trichloromethyl pyridine, 10 parts of Triton X-155 and 65 parts of xylene were mixed together and the resulting concentrate composition dispersed in water to produce a spray composition containing about 18 pounds of the pyridine compound per 100 gallons of spray mixture. This composition was employed for the control of soya bean, pigweed, foxtail, purslane and tomato. The composition was applied to the foliage of the plants in the usual manner and at a dosage of about 100 gallons per acre. One week later a 100 percent control of all treated plants was observed. In contrast, the named plant species were found to be growing vigorously in the plots maintained as controls.

*Example 12*

A spray composition containing about 4.5 pounds of 3,4,5-trichloro-2-trichloromethyl pyridine per 100 gallons was similarly prepared from the concentrate composition of Example 11. This composition was applied to purslane at a dosage of 100 gallons per acre and the plants observed daily for evidence of herbicidal effect. Examination one week following the application indicated that a 100 percent control of the treated plants had been obtained. In the plot maintained as a control, the purslane plants were in an active state of growth throughout the observation period.

*Example 13*

In a further operation, aqueous spray compositions containing about 24 pounds of toxicant per 100 gallons of spray mixture were separately prepared in the usual fashion from various concentrate compositions each containing 25 parts by weight of one of a number of pyridine compounds, 10 parts of xylene and 65 parts of Triton X-155. These aqueous spray compositions were employed for the control of common crab grass. In such operations, plots of crab grass were separately sprayed with the various compositions at a dosage of about 100 gallons of spray mixture per acre. Other plots of untreated crab grass were maintained as checks. One week following the applications, the plots were examined to ascertain what control of crab grass had been obtained. The results are set forth in the following table:

| Toxicant Employed | Percent Control of Crab Grass |
|---|---|
| 2-trichloromethyl pyridine | 90 |
| 2,4-bis (trichloromethyl) pyridine | 80 |
| monochloro-2,6-bis (trichloromethyl) pyridine (boiling at 119° to 120° C. at 1 millimeter pressure) | 80 |
| dichloro-2,6-bis (trichloromethyl) pyridine (boiling at 151° C.-157° C. at 25 millimeters pressure) | 95 |
| 5-chloro-2-trichloromethyl pyridine | 85 |
| 3,5-dichloro-2-trichloromethyl pyridine | 80 |

In the check areas, the crab grass was in an active state of growth throughout the observation period.

*Example 14*

Various aqueous spray compositions each containing about 4 pounds of one of several pyridine compounds per 100 gallons of spray mixture were prepared as described in Example 13. The pyridine compounds employed were 2,4-bis-(trichloromethyl) pyridine, monochloro-2,6-bis-(trichloromethyl) pyridine (boiling at 119° to 120° C. at 1 millimeter pressure) and dichloro-2,6-bis(trichloromethyl) pyridine (boiling at 151° to 157° C. at 25 millimeters' pressure). These sprays were separately applied in the usual fashion and at a dosage of about 200 gallons per acre to the foliage of a mixed stand of foxtail and purslane. Untreated areas were maintained as controls. Observations about one week after the application, indicated that a 100 percent control of foxtail and purslane had been obtained in the treated plots. In contrast, a lush growth of both plant species was found in the plots maintained as checks.

*Example 15*

A concentrate dust composition is prepared by mechanically mixing and grinding together 75 parts by weight of 2,6-bis(trichloromethyl) pyridine and 25 parts of talc. The latter composition is thereafter dispersed in additional talc to produce a dust composition containing about 24 pounds of toxicant per 100 pounds of the ultimate mixture. This composition is adapted to be employed for the suppression of the growth of many undesirable weed species, including crab grass and purslane.

*Example 16*

A spray composition containing about 24 pounds of 4-methyl-2-trichloromethyl pyridine is prepared in the usual fashion from a concentrate composition containing 25 parts by weight of toxicant, 10 parts of Triton X-155 and 65 parts of a petroleum hydrocarbon fraction boiling at from about 312°–390° F. (Stoddard's Solvent). This aqueous emulsion composition is easily applied to the foliage of plants and is very effective for the control of many undesirable plant species and particularly for the control of crab grass in a mixed stand of crab and Bermuda grasses.

*Example 17*

Two aqueous spray compositions, one containing 5 grams of 2,4-bis(trichloromethyl) pyridine and the other 5 grams of 2,4,6-tris(trichloromethyl) pyridine per liter of ultimate composition, are prepared in the usual fashion from concentrate compositions containing 5 parts by weight of one of the pyridine compounds, 13 parts of xylene and 5 parts of Vel. These spray compositions are separately applied to different portions of a plot of a mixed stand of immature cotton plants and crab grass at a dosage of about 24 pounds per acre and the plants thereafter observed for evidence of herbicidal effect. Observations 30 and 60 days following the applications show a commercial control of crab grass with no evidence of significant injury to cotton attributable to the application of the pyridine compounds.

*Example 18*

In a further operation, the aqueous spray composition containing 24 pounds of 2-trichloromethyl pyridine as described in Example 13, was applied to a mixed stand of immature cotton plants and crab grass at a dosage of 24 pounds per acre. Observations one week following the application showed a 90 percent kill of crab grass with no evidence of injury to cotton attributable to the pyridine compound.

The trichloromethyl substituted pyridines as employed in the compositions and methods of the present invention may be prepared by the photochemical chlorination of the methyl substituted pyridines whereby chlorine may be substituted on the methyl side chain as well as in the ring structure. Such chlorinations are generally carried out at a temperature of from about 50° to 150° C. and in the presence of a small quantity of water as reaction solvent. In carrying out the reaction, gaseous chlorine is introduced into a mixture of the methyl substituted pyridine and water. During the early stages of the chlorination, the reaction mixture is maintained at a temperature of about 50° C. Chlorine addition is continued and the temperature of the reaction mixture gradually increased to from about 125° to 150° C. and maintained within this range until the desired quantity of chlorine has been reacted as evidenced by the evolution of hydrogen chloride. Upon completion of the reaction, the desired products may be separated by fractional distillation under reduced pressure. Representative members of the trichloromethyl substituted pyridines are characterized by the properties set forth in the following table:

| | Melting Point, °C. | Boiling Point |
|---|---|---|
| 2-trichloromethyl pyridine | | 125°–126° C. at 25 millimeters pressure. |
| 5-chloro-2-trichloromethyl pyridine | 45.5–46.5 | 139°–140° C. at 25 millimeters pressure. |
| 3,5-dichloro-2-trichloromethyl pyridine | 35.5–36.5 | 161°–162° C. at 25 millimeters pressure. |
| 3,4,5-trichloro-2-trichloromethyl pyridine | 102–103 | 172°–175° C. at 25 millimeters pressure. |
| 2,6-bis(trichloromethyl) pyridine | 85–85.5 | |
| monochloro-2,6-bis(trichloromethyl) pyridine | 86.5–87.5 | 180°–185° C. at 9 millimeters pressure. |
| dichloro-2,6-bis(trichloromethyl) pyridine | 45–47 | |
| 2,4,6-tris(trichloromethyl) pyridine | 166–168 | |
| dichloro-2-trichloromethyl pyridine | | 151°–157° C. at 25 millimeters pressure. |
| 4,5-dichloro-2-trichloromethyl pyridine | | 100°–102° C. at about 1 millimeter pressure. |
| 4,5,6-trichloro-2-trichloromethyl pyridine | 60 | |
| 2,6-dichloro-4-trichloromethyl pyridine | 58 | |

The preferred trichloromethyl substituted pyridines as employed in accordance with the teachings of the present invention include compounds having in addition to one or more trichloromethyl groups such other substituents as methyl and chlorine, either or both of which may occupy the several positions unoccupied by the trichloromethyl group. Such compounds are characterized by the formula

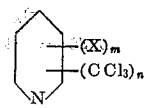

wherein each X is selected from the group consisting of hydrogen, methyl and chlorine, and $m$ and $n$ are integers whose sum is 5.

We claim:
1. A method for the suppression of the growth of vegetation which comprises applying to the foliage thereof a growth inhibiting amount of a trichloromethyl substituted pyridine.

2. A method for the suppression of the growth of vegetation which comprises applying a trichloromethyl substituted pyridine to the foliage of such vegetation at a substantially uniform dosage of at least 2 pounds per acre.

3. A method for the suppression of the growth of vegetation which comprises applying a trichloromethyl substituted pyridine to the foliage of such vegetation at a substantially uniform dosage of from 6 to 48 pounds per acre.

4. A method for the selective control of broadleaf weeds and grasses of the sub-family Panicoideae in desirable crop plants, which comprises applying a trichloromethyl substituted pyridine to the foliage of such vegetation at a substantially uniform dosage of from 2 to 48 pounds per acre.

5. A method for the selective control of grasses of the sub-family Panicoideae in a mixed stand of at least one of said grasses and Bermuda grass, which comprises applying a trichloromethyl substituted pyridine to the foliage of such grasses at a substantially uniform dosage of from 6 to 48 pounds per acre.

6. A method for the selective control of broadleaf weeds and grasses of the sub-family Panicoideae in stands of cotton, which comprises applying a substituted pyridine to the foliage of such vegetation at a dosage of from 6 to 48 pounds per acre, the substituted pyridine being a member of the group consisting of trichloromethyl pyridine, bis(trichloromethyl) pyridine and tris-(trichloromethyl) pyridine.

7. A method for the suppression of the growth of vegetation which comprises applying 2-trichloromethyl pyridine to the foliage of such vegetation at a substantially uniform dosage of at least 2 pounds per acre.

8. A method for the suppression of the growth of vegetation which comprises applying 2,6-bis(trichloromethyl) pyridine to the foliage of such vegetation at a substantially uniform dosage of at least 2 pounds per acre.

9. A method for the suppression of the growth of vegetation which comprises applying 2,4,6-tris-(trichloromethyl) pyridine to the foliage of such vegetation at a substantially uniform dosage of at least 2 pounds per acre.

10. A method for the suppression of the growth of vegetation which comprises applying a monochloro-2,6-bis(trichloromethyl) pyridine to the foliage of such vegetation at a substantially uniform dosage of at least 2 pounds per acre.

11. A method for the suppression of the growth of vegetation which comprises applying a dichloro-2,6-bis(trichloromethyl) pyridine to the foliage of such vegetation at a substantially uniform dosage of at least 2 pounds per acre.

12. A concentrate composition for the suppression of the growth of vegetation which comprises as an active toxic ingredient a trichloromethyl substituted pyridine in admixture with at least one material selected from the group consisting of finely divided inert solids and surface-active dispersing agents the active ingredient being present in the amount of from 5 to 95 percent by weight.

13. A concentrate composition for the suppression of the growth of vegetation which comprises as an active toxic ingredient a trichloromethyl substituted pyridine in admixture with a surface-active dispersing agent the active ingredient being present in the amount of from 5 to 95 percent by weight.

14. A concentrate composition for the suppression of the growth of vegetation which comprises as an active toxic ingredient 2-trichloromethyl pyridine in admixture with a surface-active dispersing agent the active ingredient being present in the amount of from 5 to 95 percent by weight.

15. A concentrate composition for the suppression of the growth of vegetation which comprises as an active toxic ingredient 2,6-bis(trichloromethyl) pyridine in admixture with a surface-active dispersing agent the active ingredient being present in the amount of from 5 to 95 percent by weight.

16. A concentric composition for the suppression of the growth of vegetation which comprises as an active toxic ingredient 2,4,6-tris(trichloromethyl) pyridine in admixture with a surface-active dispersing agent the active ingredient being present in the amount of from 5 to 95 percent by weight.

17. A composition for the suppression of the growth of vegetation which comprises as an active toxic ingredient a trichloromethyl substituted pyridine in admixture with a member of the group consisting of finely divided inert solids and aqueous emulsion the active ingredient being present in a growth-inhibiting concentration.

18. A concentrate composition for the suppression of the growth of vegetation which comprises as an active toxic ingredient a monochloro-2,6-bis(trichloromethyl) pyridine in admixture with a surface-active dispersing agent the active ingredient being present in the amount of from 5 to 95 percent by weight.

19. A concentrate composition for the suppression of the growth of vegetation which comprises as an active toxic ingredient a dichloro-2,6-bis-(trichloromethyl) pyridine in admixture with a surface-acting dispersing agent the active ingredient being present in the amount of from 5 to 95 percent by weight.

No references cited.